US011509171B2

(12) United States Patent
Vaculik et al.

(10) Patent No.: US 11,509,171 B2
(45) Date of Patent: *Nov. 22, 2022

(54) WIRELESS CHARGING PULSE GENERATOR

(71) Applicant: NXP USA, Inc., Austin, TX (US)

(72) Inventors: Lukas Vaculik, Valasske Mezirici (CZ); Ivan Sieklik, Martin (SK); Radek Holis, Karolinka (CZ)

(73) Assignee: NXP USA, Inc., Austin, TX (US)

( * ) Notice: Subject to any disclaimer, the term of this patent is extended or adjusted under 35 U.S.C. 154(b) by 199 days.

This patent is subject to a terminal disclaimer.

(21) Appl. No.: 17/075,621

(22) Filed: Oct. 20, 2020

(65) Prior Publication Data

US 2022/0123591 A1    Apr. 21, 2022

(51) Int. Cl.
*H02J 50/12* (2016.01)
*H02M 7/5387* (2007.01)

(52) U.S. Cl.
CPC ......... *H02J 50/12* (2016.02); *H02M 7/53871* (2013.01)

(58) Field of Classification Search
CPC ...... H02J 50/12; H02M 7/53871; H02M 3/01; H02M 7/5395
See application file for complete search history.

(56) References Cited

U.S. PATENT DOCUMENTS 11,108,324 B1 * 8/2021 Vaculik ............... H02P 7/29
2009/0292936 A1 * 11/2009 Hayakawa ........... G06F 1/025
713/330

2013/0015798 A1 * 1/2013 Wright ............... H03K 7/08
323/241

(Continued)

OTHER PUBLICATIONS

"OctoWS2811 Technical Details", PJRC Electronic Projects Components Available Worldwide, 12 pgs., retrieved from the internet Oct. 20, 2020 at: https://www.pjrc.com/teensy/td_libs_OctoWS2811.html#tech.

(Continued)

*Primary Examiner* — Jared Fureman
*Assistant Examiner* — Michael J Warmflash

(57) ABSTRACT

A controller for generating a sequence of pulse is disclosed. The controller includes a plurality of pulse width modulation (PWM) modules. Each PWM Module configured to generate a first sequence of pulses and a second sequence of pulses each having a width that is modulated by a PWM value stored in a PWM register of the PWM module. Each PWM module includes two outputs. The first sequence of pulses is outputted on the first output and the second sequence of pulses is outputted on the second output. The controller also includes a memory having a plurality of memory tables and a plurality of direct memory access (DMA) modules. Each memory table configured to store PWM values to be written into the PWM register and each DMA module is coupled to a respective PWM module in the plurality of PWM modules and to a respective memory table in the plurality of memory tables and configured to write a PWM value from the memory table into the PWM register in response to a DMA trigger. The controller further includes a core coupled to the plurality of memory tables and configured to write the PWM values into the plurality of memory tables.

19 Claims, 13 Drawing Sheets

(56) References Cited

U.S. PATENT DOCUMENTS

| | | |
|---|---|---|
| 2013/0147552 A1 | 6/2013 | Hsu et al. |
| 2014/0207979 A1 | 7/2014 | Wu |
| 2017/0077712 A1* | 3/2017 | Sugisawa .................. H02J 4/00 |
| 2019/0103771 A1 | 4/2019 | Piasecki et al. |

OTHER PUBLICATIONS

U.S. Appl. No. 16/831,311, filed Mar. 26, 2020, entitled: Controller-Based Variable Duty Cycle Pulse Width Modulation. The Examiner is referred to the copending patent prosecution of the common Applicant (no attachment).

Freescale/NXP USA, Inc., "1000W Class-D Audio Amplifier Using Kinetis Quick Start Guide", 8 pages (Nov. 18, 2015).

Notice of Allowance for U.S. Appl. No. 16/831,311, 11 pgs, (dated May 13, 2021).

\* cited by examiner

WIRELESS CHARGING PULSE GENERATOR

CROSS-REFERENCE TO RELATED APPLICATIONS

This application is related to application Ser. No. 16/831,311 filed on Mar. 26, 2020 entitled "CONTROLLER-BASED VARIABLE DUTY CYCLE PULSE WIDTH MODULATION", which is incorporated herein in its entirety by reference.

BACKGROUND

Pulse width modulation (PWM) signals are used as inputs to control an output of a power converter. A PWM signal has a sequence of pulses, usually with a consistent amplitude and a fixed frequency. The width of each pulse is modulated to vary the duty cycle or on time of the pulse. When this modulated digital output is applied to a power converter an analog waveform is produced. Power converter outputs have been used to power electric motors, charge batteries, drive illumination sources and for many other types of loads. The power converter and its connected power source can be designed to suit the demands of different loads while the PWM signal serves only as a low power digital control input. When the PWM signal has a higher duty cycle, then the power converter produces a higher power output. By increasing or decreasing the widths of the pulses, the resulting power amplitude can be increased or decreased to suit different loads.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a controller for generating a sequence of pulse is disclosed. The controller includes a plurality of pulse width modulation (PWM) modules. Each PWM Module includes two outputs. Each PWM Module is configured to generate a first sequence of pulses and a second sequence of pulses, each pulse in the two sequences of pulses having a width that is modulated by a PWM value stored in a PWM register of the PWM module. The first sequence of pulses is outputted on the first output and the second sequence of pulses is outputted on the second output. The controller also includes a memory having a plurality of memory tables and a plurality of direct memory access (DMA) modules. Each memory table configured to store PWM values to be written into the PWM register and each DMA module is coupled to a respective PWM module in the plurality of PWM modules and to a respective memory table in the plurality of memory tables and configured to write a PWM value from the memory table into the PWM register in response to a DMA trigger. The controller further includes a core coupled to the plurality of memory tables and configured to write the PWM values into the plurality of memory tables. In some examples, the controller further includes a feedback loop for each of the plurality of memory table and configured to provide adjustment values for the PWM values. The feedback loop includes an analog to digital converter (ADC) to convert an analog signal to a digital data and a buffer to store the digital data.

The PWM module is configured to send the DMA trigger to the DMA module after generating each pulse of the sequence of pulses. The memory table has a sequentially ordered plurality of PWM values, and wherein the DMA module is configured to write the PWM values from the memory table into the PWM register in the sequential order in response to each DMA trigger. The PWM values are adjusted using the adjustment values. The DMA module is configured to write the first PWM value in the sequence after writing the last PWM value in the sequence. The PWM module is configured to generate at least two different sequences of pulses to drive two inputs of a power converter. The PWM module generates two sequences of pulses using a same register that includes the values to be propagated to the two outputs of the PWM module. The first sequence of pulses translates into a positive side of an analog wave output of a power converter and the second sequence of pulses translates into a negative side of the analog wave output of the power converter In some examples, the controller further includes an input signal interface coupled to the core configured to receive an input signal and wherein the core is configured to modify the PWM values of the table of PWM values in response to the input signal and to write the modified PWM values into the memory.

In some examples, the core is configured to modify the PWM values by selecting a stored set of different PWM values in response to the input signal. The core is configured to modify the PWM values by incrementing and decrementing the PWM values in response to the input signal. The input signal is a closed feedback loop from a power output of a power converter.

In another embodiment, a charging system is disclosed. The charging system includes a resonant circuit configured to apply a resonant field to charge a device and a power converter configured to receive a direct current power and a first sequence of pulses and a second sequence of pulses and produce an alternating power output to drive the resonant circuit, wherein the first sequence of pulses translates into a positive side of the alternating power output and the second sequence of pulses translates into a negative side of the alternating power output. The charging system also includes a pulse width modulation (PWM) module configured to generate the sequence of pulses each having a width that is modulated by a PWM value stored in a register of the PWM module and a memory having a table of PWM values configured to be written into the PWM module register. The charging system further includes a direct memory access (DMA) module configured to write a PWM value from the table into the PWM register in response to a DMA trigger from the PWM module and a processing core configured to write the PWM values into the table. A feedback loop is also included that is coupled to an output of the power converter and to the processing core.

In some examples, the processing core is configured to modify the PWM values of the memory table in response to an input signal from the feedback loop and to write the modified PWM values into a second memory table that is different from the table. The feedback loop includes an analog to digital converter (ADC) to convert an analog signal to a digital data and a buffer to store the digital data. The processing core is configured to generate an adjustment value for the PWM values using the digital data and store the adjustment value in a second memory table in the memory. A second DMA module coupled to the second memory table and the buffer. The second DMA module is configured to access data from both the second memory table and the buffer. The processing core is configured to modify PWM values stored in the table according to the adjustment value. The PWM module is configured to receive the adjustment value from the second memory table and generate the sequence of pulses using the PWM values and the adjustment value.

DETAILED DESCRIPTION

It will be readily understood that the components of the embodiments as generally described herein and illustrated in the appended Figs. could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
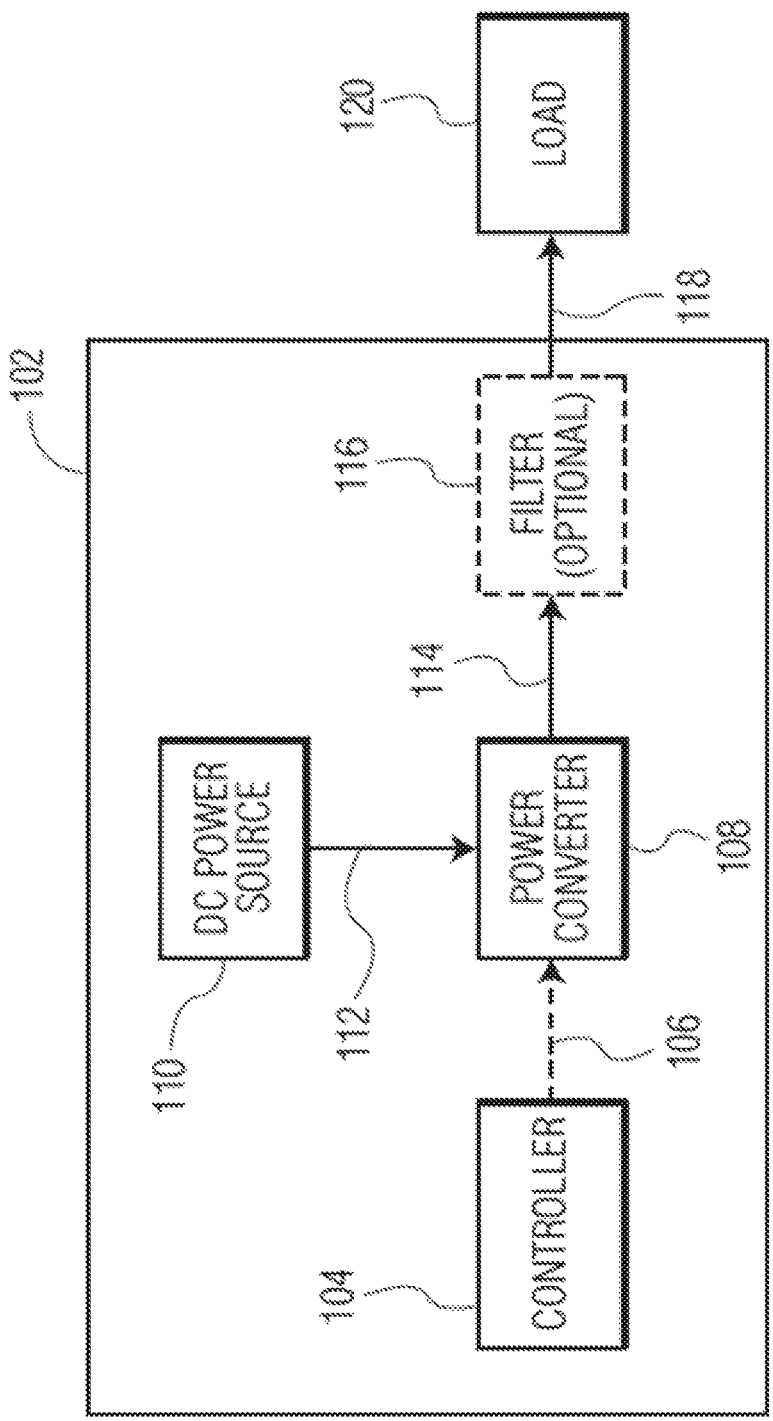
FIG. 1 depicts an example of a power generation system and a load.

FIG. 1 depicts an example of a power generation system 102 and a load 120. The power generation system provides power to drive the load 120. The power generation system includes a controller 104 coupled to a power converter 108. The power converter 108 is coupled to a DC (Direct Current) power source 110 and to the load 120. The controller 104 sends a pulse width modulation (PWM) digital signal 106 to the power converter 108 to control a power output 114 of the power converter 108. The DC power source 110 provides power 112 to the power converter 108. The power converter applies the PWM signal 106 from the controller 104 to the received power 112 to generate a modulated analog power output 114. In some embodiments, the power output is an AC (Alternating Current) waveform and is applied to the load 120 though an optional filter 116 to smooth the analog power output. The resulting filtered power 118 from the power generation system 102 is applied to drive the load 120.

The power source 110 and the power converter 108 may be designed for any particular load including inductive battery chargers, electric motors of any kind, audio voice coils, illumination systems, digital circuitry and electronic components, and power distribution systems. In some examples, because the digital PWM signal is used only as a control input, it may be applied to multiple power converters simultaneously and the signal may be inverted to feed multiple inputs of a single power converter.

The power converter 108 may take different forms depending on the nature of the load 120, such as a Class-D converter, push-pull converter, half-bridge converter, full-bridge converter or another form. The PWM signal output 106 of the controller 104 is configured to provide an output suited to the particular type of converter.

Figure 2:
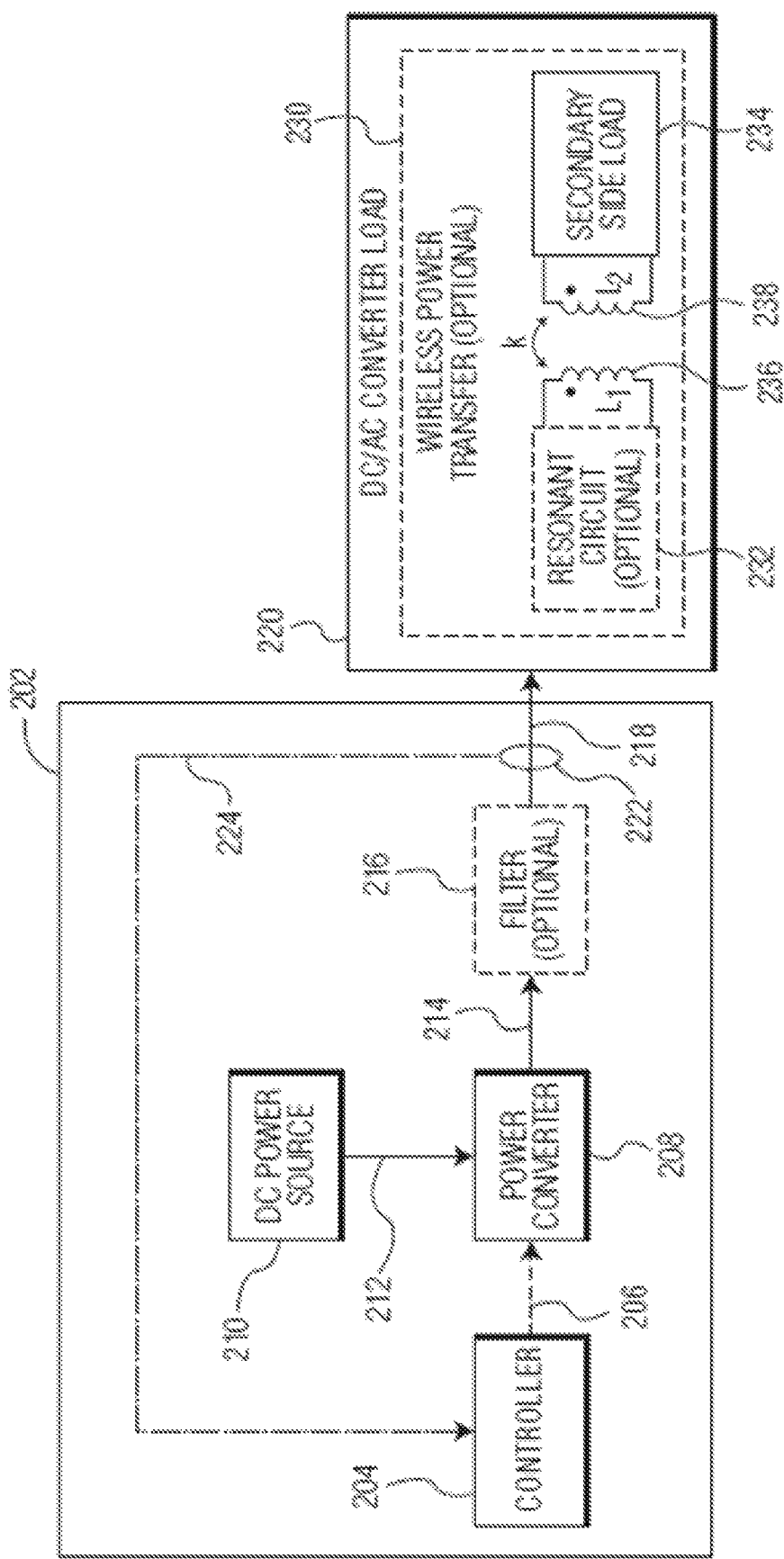
FIGS. 2 and 3 depict alternative examples of a power generation system and a load for wireless charging.

FIG. 2 depicts another example of a power generation system 202 and a load that is configured for wireless charging. In some embodiments, a DC/AC converter load 220 includes a wireless power transfer system 230, with an optional resonant circuit 232 coupled through a primary coil 236 to a secondary side load 234 coupled to the resonant circuit 232 primary coil through a secondary coil 238. The resonant circuit drives the power through the coils matching the characteristics of the load. In some embodiments, the secondary side load 234 represents a battery and the resonant circuit represents a wireless charging pad or plate. Such a configuration is suitable for charging small batteries for wireless communications devices, larger batteries for tools, and still larger batteries for vehicles. Any of a variety of different charging scenarios may be accommodated, by appropriate modification of the power supply 210 and the power converter 214.

In this example, a controller 204 is connected to a power converter 208 to provide a PWM signal 206 to the power converter 208. The power converter 208 is configured to drive the resonant circuit and may produce an AC output such as a full or half-bridge power converter that generates a power output 214 by modulating input power 212 from a connected DC power source 210. A modulated AC power output 214 from the power converter may optionally be processed through a filter 216 to generate the final filtered AC power supply 218 to the load 220.

In some embodiments, a sensor 222, such as an inductive loop current sensor is electrically coupled to the filtered AC power supply output 218. An output 224 from the sensor is provided to the controller 204 to allow the controller to adjust the PWM signal 206 in response to the sensed current. The sensor output 224, in this case a closed loop feedback signal, may be used to regulate the form of the PWM signal. In some embodiments, a battery load will present varying amounts of resistance as the battery charges. By measuring the current through the sensor, the controller may be configured to reduce the supplied current as the battery becomes more fully charged. This may be done by decrementing the PWM values in a stored set of PWM values as the resistance increases. Similarly, the core may increment the PWM values if the resistance decreases. By incrementing and decrementing the PWM values, an appropriate power is supplied to the AC/DC converter load 220.

In other embodiments, the controller 204 is connected to different or additional sensor inputs or to external components (not shown) such as an actuator, or some other control device and is programmed to determine an appropriate PWM signal based on that input. In some embodiments, the controller 104 receives an input sensor signal from the load 120 that is applied by the controller to regulate the duty cycle of the PWM signal 114. In some embodiments, the controller receives a command or control signal from an external component to determine the nature of the power output that is to be generated. In some embodiments, the command is an ON or OFF signal and the controller provides a constant output PWM signal. The command may optionally further indicate a particular power output level to be applied. The power 214 applied to the load may be constant or varied as determined by the PWM signal 206 from the controller 204. In some embodiments, the controller includes a host (not shown), which may include, for example, a software application that is stored in memory of the controller and executed by processing circuits of the controller. The controller may be of a type known in the field, but uniquely configured for the described implementations. The controller may be implemented as, for example, digital signal processors (DSPs), digital signal controllers (DSCs) and/or central processing units (CPUs).

Figure 3:
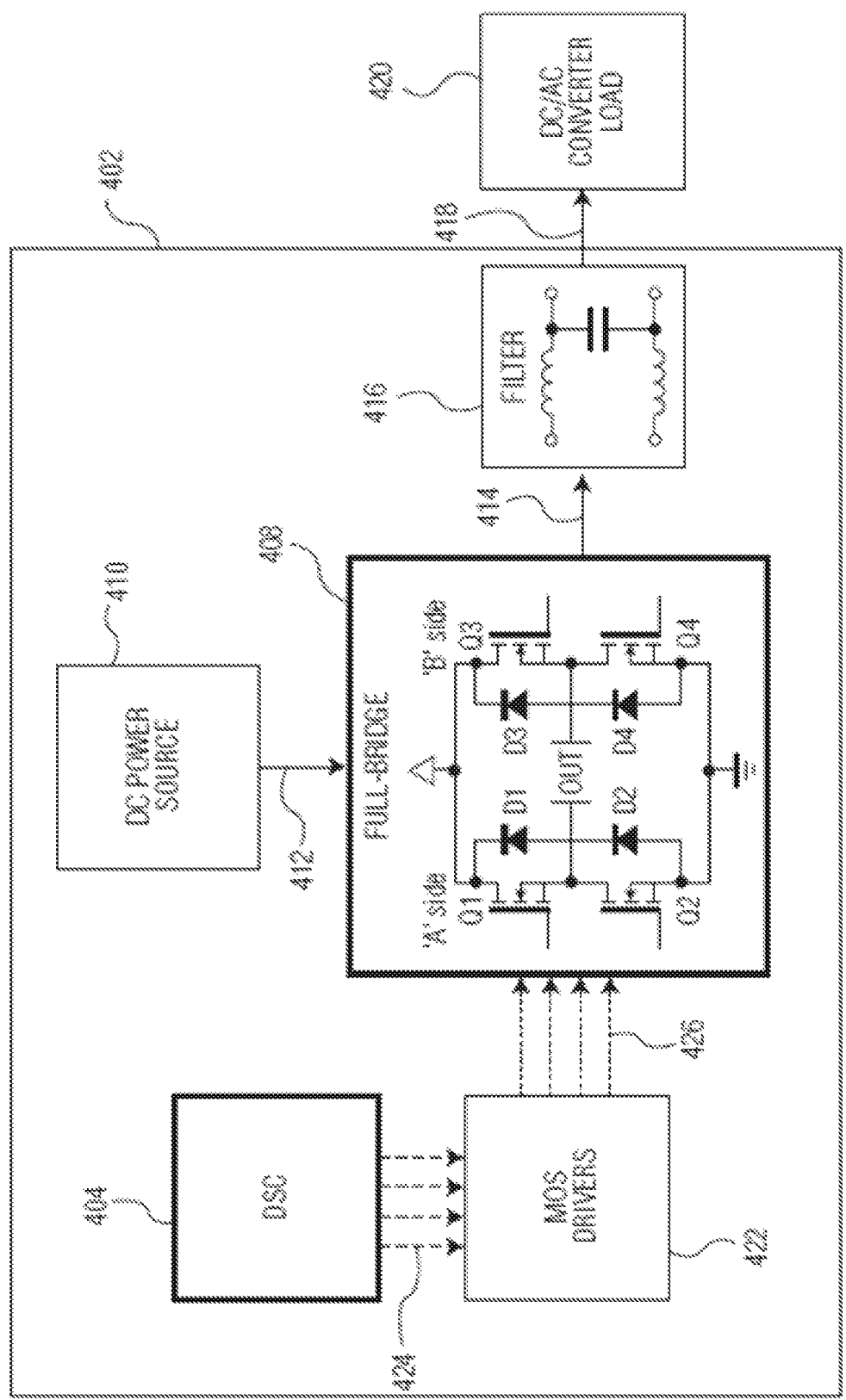

FIG. 3 depicts an alternative implementation of a power generation system 402 and a load 420. In this embodiment, a DSC (Digital Signal Controller) is configured to generate four PWM signals 424, such as the Q1, Q2, Q3, and Q4 signals of FIG. 3A. The PWM signals are applied to MOS-FET (Metal Oxide Semiconductor Field Effect Transistor) based drivers 422 that are coupled to the DSC. The internal circuitry of the controller is primarily optimized for minimum power and minimum current in order to reduce the power consumption of the digital circuitry. The MOS drivers 422 may be configured as a line stage or a power amplifier to generate a stable high current signal 426 to a connected power converter 408. There may be an external current supply (not shown) connected to the MOS drivers to supply the current.

The power converter receives DC power 412 from a connected source 410 and applies the PWM drive signals 426 to the four inputs of a full bridge power converter 408 to produce a rough sine wave or other output power signal 414. This signal is filtered in an inductive-capacitive power filter 416 or any other type of filter between the power converter 408 and a load 420 to provide a filtered power output 418 to the load 420. The DSC may vary the PWM according to any particular internal programming or external command or sensor input or a combination of these types of control inputs.

Figure 4:
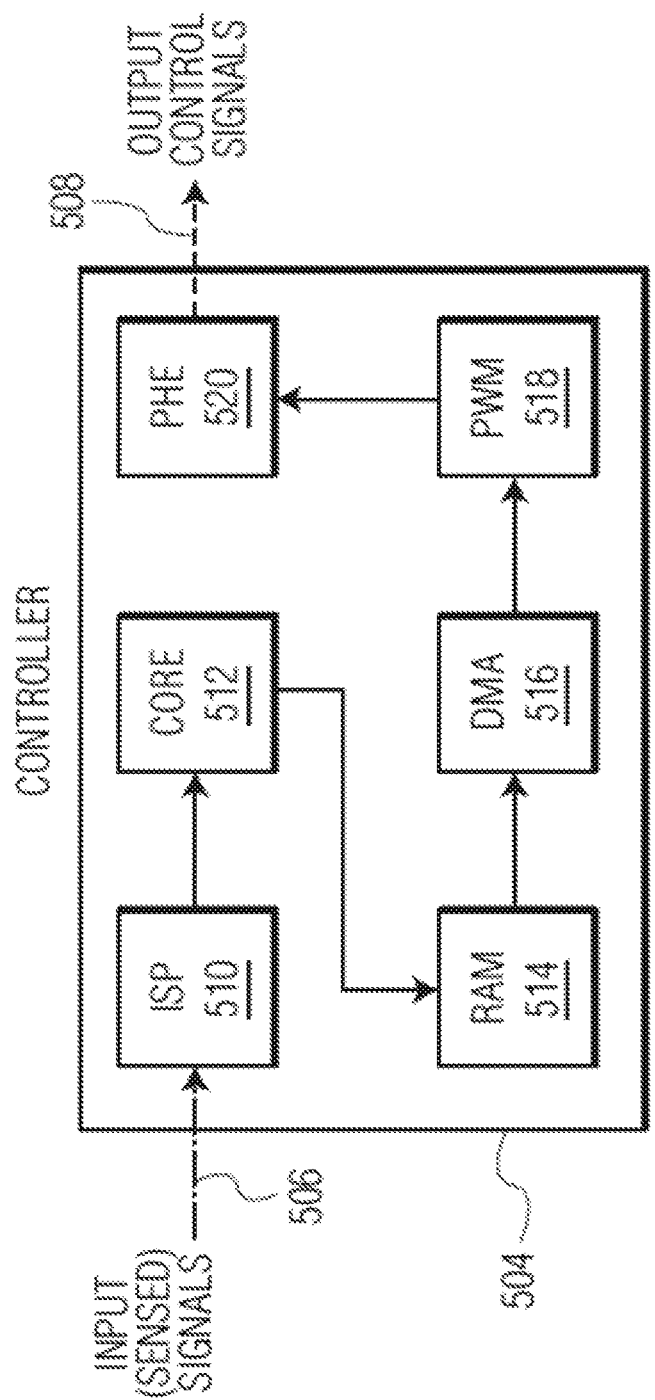
FIG. 4 depicts a further alternative example of a power generations system and a load.

FIG. 4 depicts an example of components within the controller for generating the PWM signals described herein. The controller 504 includes an input signal processing (ISP) module 510 connected to an input port of the controller. A core is coupled to the ISP on one side and to a memory 514 on the other side. The core may be a processing core, a controller core, a DSP core or any other type of core. The memory is coupled to a DMA (Direct Memory Access) module 516. The DMA module is coupled to a PWM module 518 and the PWM module is coupled to a peripheral interface (PHE) 520. In this and the other figures there may be more connections than are shown in the diagrams. For example, the controller may be coupled to the DMA and PWM modules for a variety of different purposes. In addition, the controller may have many more components that are not shown in order to simplify the drawing figure.

The controller 504 receives an input 506 at the ISP module 510 of the controller. The ISP module 510 is an input signal interface that performs signal conversion, regulation, bus protocols and any other necessary functions, on any input signal received at the interface. The function depends on the nature of the input signal 506. In some embodiments, the ISP 510 provides input signal conversion using an analog to digital converter and comparator or a sample and hold circuit. The ISP 510 may receive multiple input signals of different types depending on the implementation including closed loop feedback regulation. The sensor or command input from the ISP 510 is provided to the processing core 512 which analyzes the inputs and determines a PWM signal to be generated. While the pulses of the PWM signal may be generated at any suitable rate from one to millions of Hz, the pulses are generated by the DMA module 516, PWM module 518 and PHE 520. These blocks operate independently of the core so that pulses are generated continuously without any processing core 512 invention until a change in the output waveform is required. After the pulse generation process is started, the processing core 512 of the controller 504 may perform many other functions in between performing the PWM generation functions mentioned herein.

The processing core 512 selects a PWM sequence based on the ISP input and applies the selection to the RAM (Random Access Memory) module or memory module 514 to select a set of values corresponding to the selected PWM sequence. In some embodiments, the RAM 514 stores the PWM values in the form of tables as in an array of registers, for example a sequentially ordered set of PWM values. While the memory 514 is being referred to as RAM it may take any suitable form including flash, SRAM (Static Random Access Memory), magnetic memory, or any other suitable type. The core 512 is responsible for processing the input sensor data and for managing and maintaining the tables of PWM values that are stored in the RAM 514. In some embodiments, the core 512 maintains multiple tables of different PWM values to produce different PWM signals in response to the input signal 506. In some embodiments, the core 512 modifies the PWM values stored in a table in the RAM 514 based on the sensor input signal 506. In other words, the core generates new or modified PWM values and writes these new or modified PWM values into registers in a table of the RAM. When the sensor input signal 506 indicates to the core 512 that there is no change to the PWM values, then the core 512 does not necessarily interact with the RAM 514 so that the operations continue unchanged. As mentioned above, the input signal 506 may be measurement from a sensor 506 or a command from an external component (not shown).

The stored PWM values are read from the tables of the RAM 514 by the DMA module 516 which controls the provision of the selected values to the PWM module 518 independent of the core 512. The DMA module 516 allows the PWM module 518 direct access to the PWM values stored in the appropriate table in the RAM 514. The PWM module generates the PWM pulse sequence as selected by the processing core 512 using the values read from the RAM 514 and written into the PWM module 518 by the DMA module 516. The pulse sequence generated by the PWM module is provided to the peripheral driver module 520 which feeds the output PWM sequence 508 with appropriate electrical characteristics, to drivers or to the power converter depending on the particular implementation. The DMA module 516 may be incorporated into the processing core or another component of the controller. The DMA module 516 attends to the communication between the RAM 514 and the PWM module 518 allowing the processing core to attend to other tasks.

Figure 5:
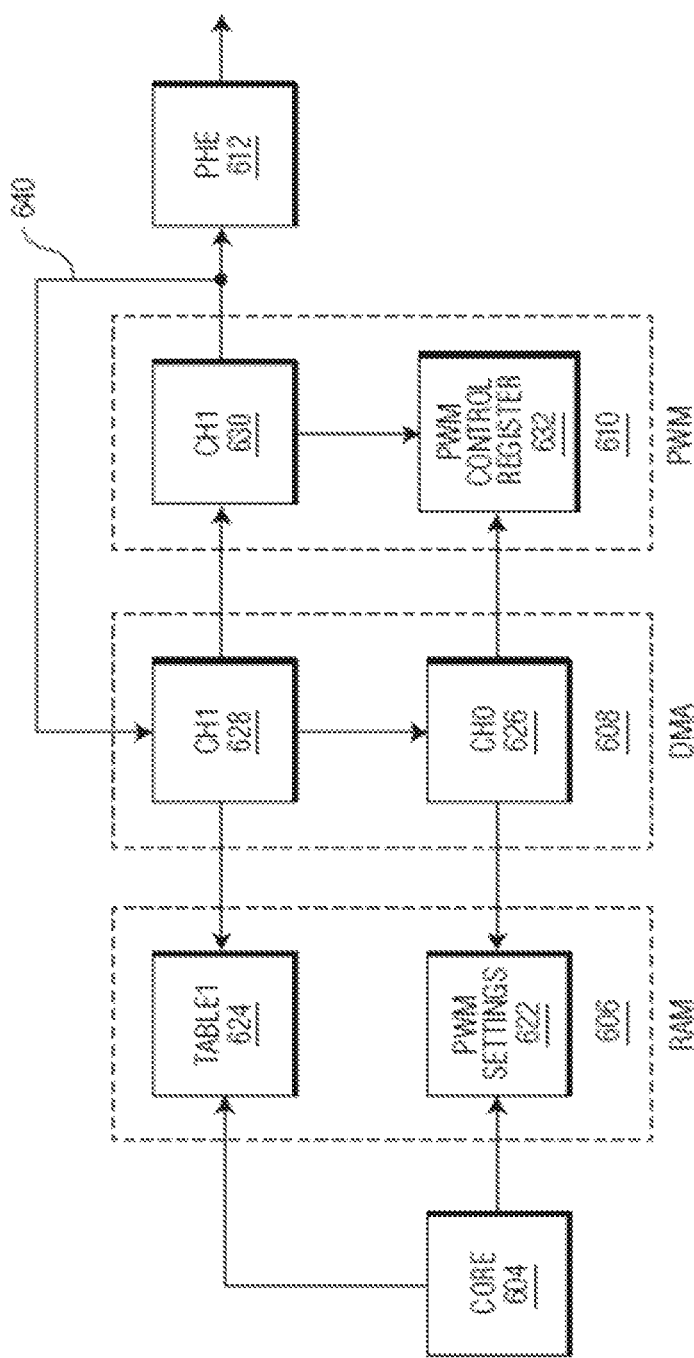
FIG. 5 depicts an example of components within a controller for generating a PWM pulse sequence.

FIG. 5 illustrates components and operations in a controller to generate a PWM sequence. A processing core 604 is coupled to a memory 606 that has a memory table 624, labeled Table 1, for PWM values and a second table 622, labeled as PWM settings, with settings for the PWM module. The first table 624 has multiple registers in sequential order, each representing a particular timing and duration for a pulse. In some embodiments, the table is pre-configured. In some embodiments there are multiple stored tables each with a different set of PWM sequences. The core can select a particular stored set of PWM values in response to different input signals. In some embodiments, the core 604 generates, sets, and modifies the values in one or more tables to suit particular PWM sequences. The core 604 may control and modify the PWM settings table 622 of the memory 606.

The memory 606 is coupled to a DMA module 608 with multiple channels 626, 628 to transfer data from the memory 606 to other components. In the illustrated example, the channels are labeled as CH0 and CH1. The DMA module is coupled to registers of the PWM module 610 that generates the PWM sequence as described above. The PWM module has control registers 632 coupled to CH0 626 of the DMA module 608 and a pulse generation register 630 coupled to CH1 620 of the DMA module 608. The output of the PWM module 610 goes to the connected PHE 612 module, which may be an I/O interface, and from there to external components, such as a power converter.

In operation, data stored in the memory table 624 contains multiple duty cycle values for output CH1 630 of the PWM module 610. The DMA module's CH1 628 provides direct memory access from the PWM module 610 to the Table 1 values without any action by the core 604. For the DMA module 608, each CH1 access will be made with a source address to read the addressed register in the memory's Table 1. The DMA module uses a destination address to the PWM CH1 register 630 to write the value.

In an embodiment, to generate the pulse sequence after the DMA CH1 is enabled, the DMA module 608 transfers a first Table 1 configuration value through CH1 to the PWM. After this transfer is complete, the DMA module enables CH0 and transfers the PWM setting to the PWM module control register 610, by accessing the PWM settings 622 and writing the settings into the PWM 610. With the PWM module 610 configured, the DMA module transfers another PWM value through CH1 after each PWM CH1 period. This period may be determined based on a PWM control register or in another way. This timing period may serve as a trigger to transfer the next CH1 value from the memory to the PWM CH1 register. Alternatively, the PWM module 610 generates a trigger 640 to the DMA module after each pulse is generated. In response to this trigger, the DMA module CH1 628 accesses Table 1 of the memory to fetch another PWM value to store in the PWM CH1 register.

The process of refreshing the PWM CH1 value after each pulse continues from the initial to the final PWM value for the selected table. After the last value in the table has been provided to the PWM module, then the DMA module reloads the table in CH1 628 and loops back to the initial value. In this way, Table 1 624 in the memory 606 can be used to define a cycle of a particular waveform, such as the sine wave of FIG. 9 from time A to time B and the same PWM values may be used over again for each succeeding cycle. To generate a different waveform, the core 604 may modify the values in the memory table 624 or provide a different table for use by the DMA module. In some embodiments, the core modifies the stored set of PCM values in one or more of the tables by incrementing or decrementing the stored set of values. The core can do so in response to an input signal or an input parameter. In another example, the DMA module loads a full cycle of PWM values into the PWM module and the PWM module cycles through the values from first to last and then loops back to repeat the cycle until the core determines that the waveform is to be changed.

The configuration of FIG. 5 is well-suited for application to a single input power converter such as a single channel DC/AC converter. The configuration may be modified by adding more channels to suit a much larger number of inputs to drive a more complex power converter or to drive multiple different power converters from different PWM output sequences.

Figure 6:
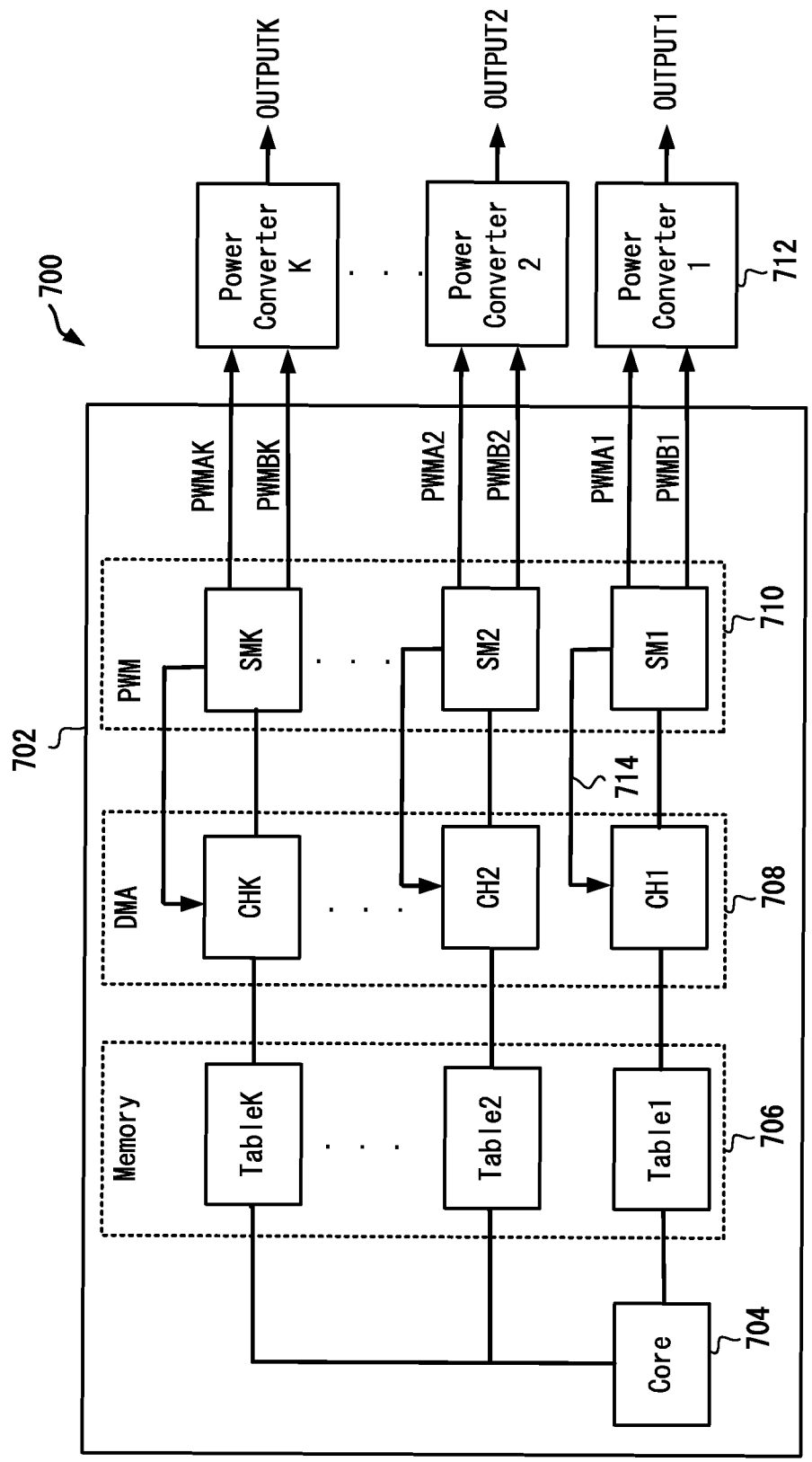
FIG. 6 illustrates components and operations in a controller to generate multiple PWM pulse sequences.

FIG. 6 illustrates a multi-channel configurable PWM system 700. The system may be expanded to have many more channels according to the capability of a controller 702 and availability of the number of PWM channels in the controller 702. The controller 702 includes a processing core 704, a memory 706, a DMA module 708 and a PWM module 710. The DMA module 708 and the PWM module 710 may include a plurality of channels (e.g., CH1, CH2 . . . CHK) to generate multiple PWM sequences independent of each other. In some examples, the processing core 704 may be configured to produce different types of output signals at the power converter outputs. The shape, frequency and amplitude of the output wave at OUTPUT1 (for example) is controlled by the data stored in Table1. The memory 706 may include a plurality of tables (e.g., Table1, Table2 . . . TableK) corresponding to the number of outputs of the controller 702. The PWM module 710 may also include a plurality of sub modules (e.g., SM1, SM2 . . . SMK). Each sub module (e.g., SM1) may provide two inputs (e.g., PWMA1, PWMB1) two the power converter 712. Similarly, SM2 provides two outputs PWMA2, PWMB2 and SMK provides two outputs PWMAK, PWMBK. The power converter 1 provides an output OUTPUT1, the power converter 2 provides an output OUTPUT2 and the power converter K provides the output OUTPUTK. The outputs can be used for applications such as induction charging.

Figure 8:
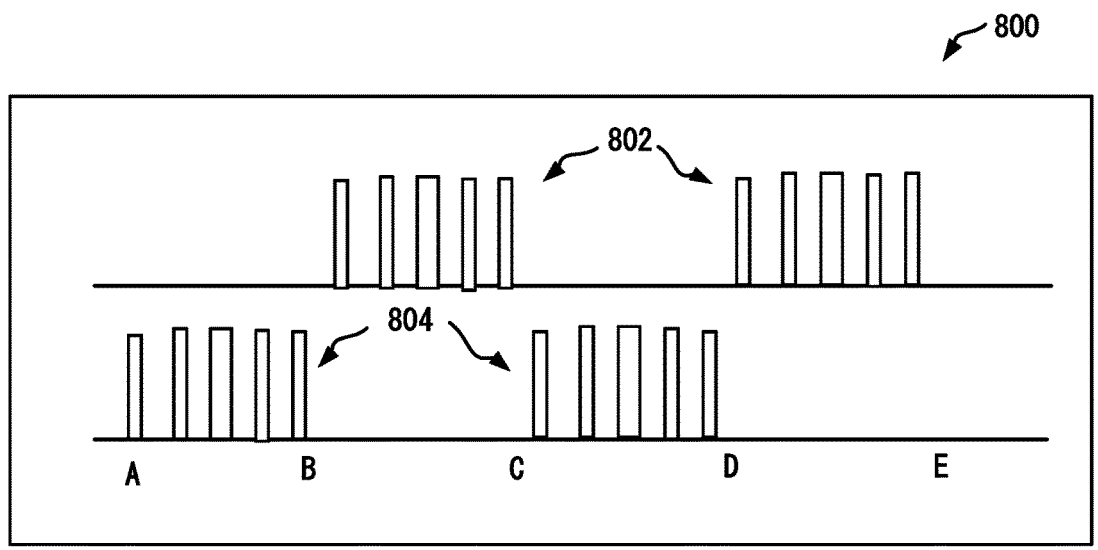
FIG. 8 illustrates an example PWM sequence generated by the system of FIG. 6.
Figure 9:
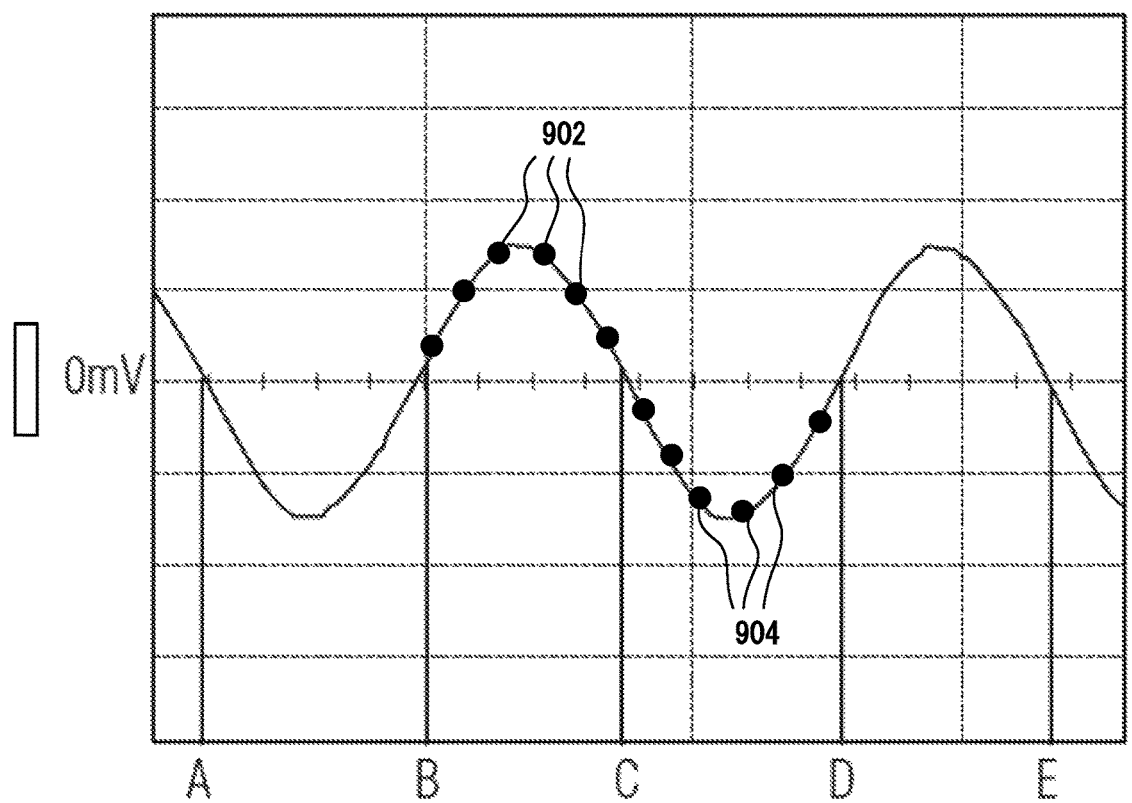
FIG. 9 illustrates an example of a filtered power signal generated by a power converter module using the sequence of FIG. 8.

As shown in FIGS. 8 and 9 that shows PWM pulses 800 and a signal 900 at $OUTPUT_X$, the signal $PWMA_X$ (where X→1, 2 . . . K) provides a positive PWM pulse that translates into a positive side of the output signal at $OUTPUT_X$ and the signal $PWMB_X$ provides a positive PWM purse that translates into a negative side of the output signal at $OUTPUT_X$.

The processing core 704 may control the shape of the signal $OUTPUT_X$ by writing PWM values into $Table_X$. In one example, $Table_X$ includes rows of values V1, V2, V3, V4, V5 (or Val1, Val2, Val3, Val4, Val5). V2 and V3 may represent the width of an output PWM pulse on the positive side (FIG. 8, the pulses 802) and V4 and V5 may represent the width of an output PWM pulse on the negative side (FIG. 8, the pulses 804). In some examples, the value V1 may be used for generating an internal trigger, for example, for the sampling of the ADC 720. Note that in FIG. 9, a sine wave is used for example only. As discussed above, other shapes such as a triangular wave, square wave or other shapes are possible using the values stored in $Table_X$. As shows in FIG. 9, the values stores in $Table_X$ corresponds to points 902, 904 on the signal $OUTPUT_X$. By adjusting the values stored in the table $Table_X$, different output shapes can be derived.

Figure 10:
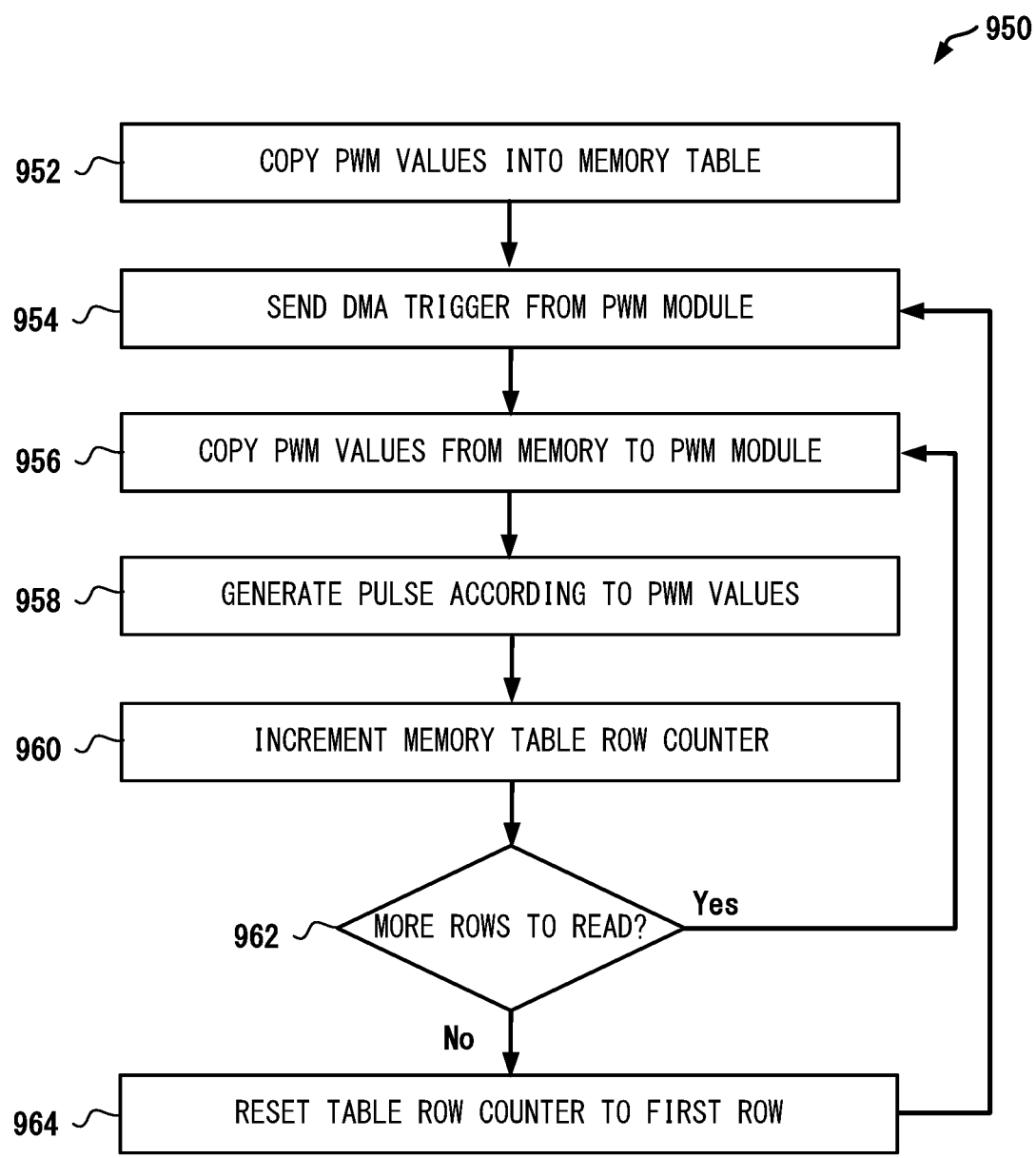
FIG. 10 is a process flow diagram of an example of generating a PWM pulse sequence.

FIG. 10 depicts a method 950 performed by the controller 702 of FIG. 6. Accordingly, at step 952, the processing core 704 copies the PWM values (e.g., rows of V1, V2, V3, V4, V5) to $Table_X$. In one example, for the positive side of the signal $OUTPUT_X$, V4 and V5 are zero and for the negative side of the signal $OUTPUT_X$, V2 and V3 are zero. In some examples, the number of rows in $Table_X$ for the positive side may be different from the number of rows in $Table_X$ for the negative side. The process may start when a load is connected to $OUTPUT_X$. At step 954, the sub module $SM_X$ sends a DMA trigger 714 to the DMA module 708 (i.e., $CH_X$). At step 956, the values are copied from $Table_X$ to $SM_X$. At step 958, $SM_X$ produces PWM signals $PWMA_X$ and $PWMB_X$. At step 960, the $Table_X$ row counter is incremented and at decision step 962, if there are more rows left to be read, the control goes back to step 956, else at step 964, the row counter is reset to point to the first row in $Table_X$ and control goes back to step 954. The method 950 may continue to run until a load coupled with $OUTPUT_X$ is disconnected or the controller 2 is switched off. In some other examples, instead of reading $Table_X$ row by row, all rows may be copied to $SM_X$ in one read. In some examples, the controller 702 may be implemented without using the DMA module 708 and providing $SM_X$ a memory addressing based reading data from $Table_X$ through the processing core 704.

Figure 7:
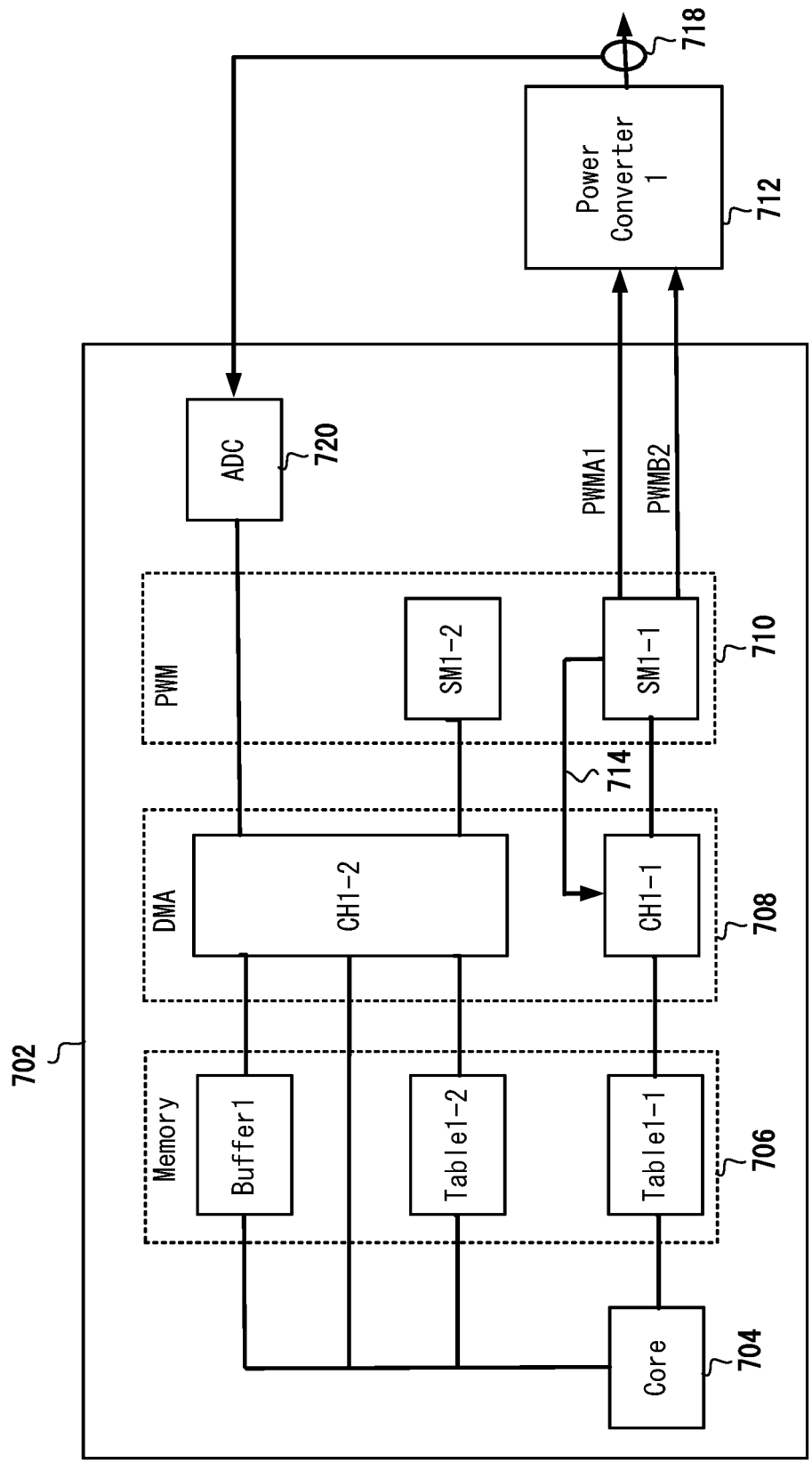
FIG. 7 illustrates components and operations in a controller to generate a PWM pulse sequence based on an output feedback.
Figure 11:
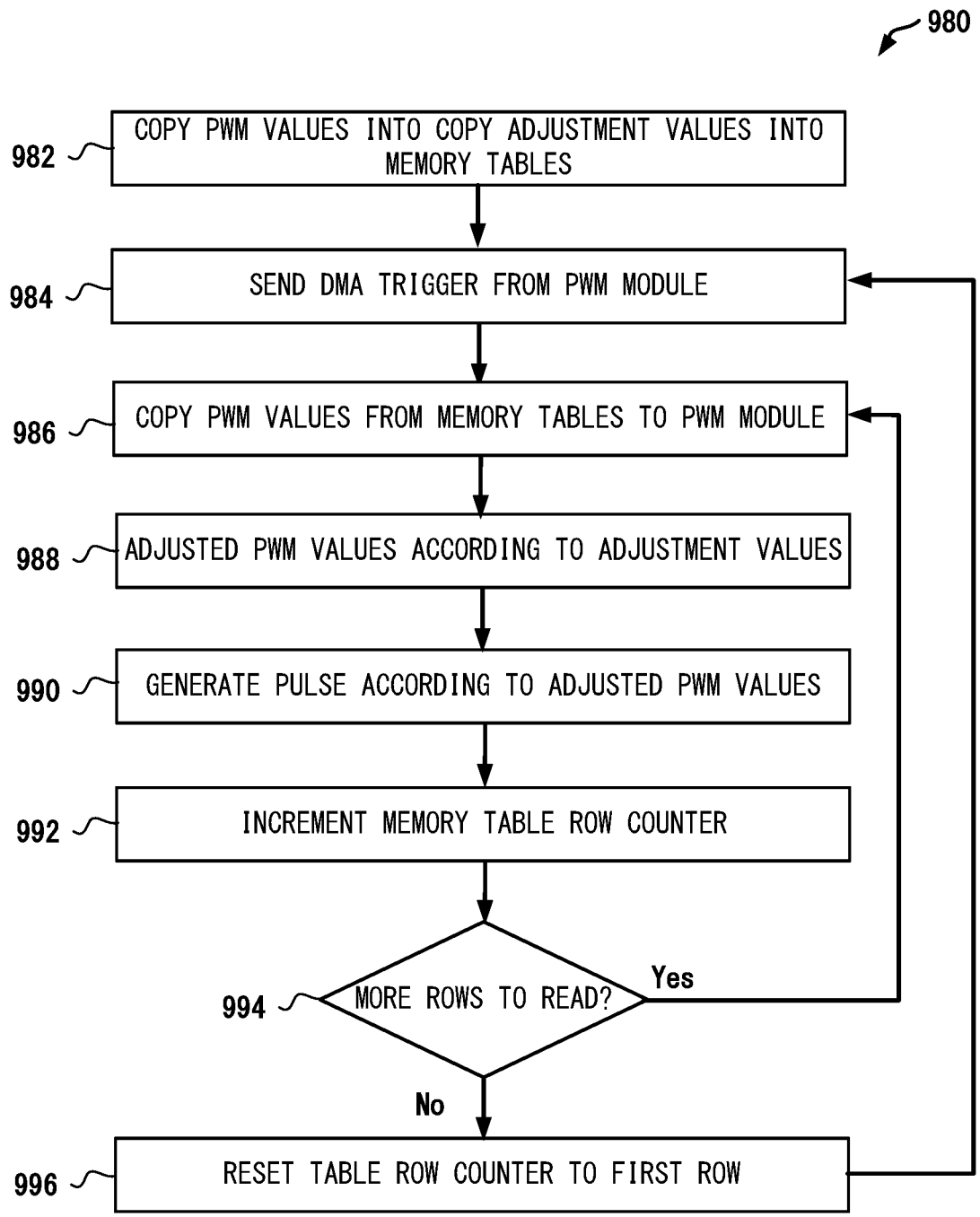
FIG. 11 is a process flow diagram of an example of generating a PWM pulse sequence based on a feedback loop.

In some examples, depending on the load characteristics of a load to be coupled with $OUTPUT_X$, an adjustment to the values V1, V2, V3, V4, V5 may be needed. In one embodiment, the adjustments can be made based on an output sensor based feedback loop (similar to the sensor loop 224 of FIG. 2) that includes a load sensor 718 (which is similar to the sensor 222 of FIG. 2) and an analog to digital converter (ADC) 720. In some embodiments, the processing core 704 may maintain a different set of $Table_X$ values based on the sensed characteristics of the load. In another example that is depicted in FIG. 7 and FIG. 11, instead of the processing core 704 keeps the values of $Table_X$ the same and adjust them according to the output of the sensor loop. In some examples, the processing core 704 can edit the values in $Table_X$ according to the output of the sensor loop. In other examples, the values in $Table_X$ are kept unchanged while providing the adjustment values to $SM_X$ to enable $SM_X$ to change the duty cycle and/or frequency of the PWM pulse according to the adjustment values.

For the simplicity, FIG. 7 only shows one channel of FIG. 6. The memory 706 may include a table Table1-1 for storying the PWM values and a table Table1-2 for storying adjustment values. A buffer Buffer1 may be included to store a digital representation of the output of the sensor 718. The DMA module 708 may include CH1-1 and CH1-2 DMA channels. CH1-1 performs similar to CH1 of FIG. 6. Because the sensing feedback does not need to be continuous (e.g., the controller can be configured to read the sensor values periodically at present intervals), CH1-2 DMA channel may be used both for the access to the adjustment values stored in Table1-2 and to Buffer1. In one example, Table1-2 may include frequency adjustments, which may be less frequent than amplitude adjustments stored in Buffer1, hence a same DMA channel may be shared between Table1-2 and Buffer1. The output of the sensor 718 is converted into a digital value by the ADC 720. The processing core 704 may direct CH1-2 to access Buffer1 or Table1-2 at different intervals. The PWM submodule SM1-2 that works cooperatively with SM1-1 may trigger a read access to Table1-2 data via CH1-2.

FIG. 11 depicts an operation 980 performed by the controller 704 of FIG. 7. Accordingly, at step 982, the processing core 704 copies PWM values into Table1-1 and adjustment values into Table1-2. As discussed above the adjustment values are generated based on the output of the sensor 718. SM1-1 sends a DMA trigger to CH1-1 that causes the PWM values to be copied to SM1-1. In one example, the values may be adjusted by the processing core 704 in Table1-1 based on the date stored in Buffer1 and the adjusted PWM values are copied to SM1-1, therefore, Table1-2 may not be needed. In another example, at step 984, the PWM module 710 sends a DMA trigger and in response, at step 986, the values stored in Table1-1 and Table1-2 are copied to the PWM module. In some embodiments, the value or values stored in Table1-2 may not change frequently, hence the DMA trigger for Table1-2 may not be sent simultaneous to the DMA trigger for Table1-1 data. At step 988, the PWM module 710 produces adjusted values by altering (e.g., increasing/decreasing) the values from Table1-1 using the adjustment values from Table1-2. PWM pulses by increasing or decreasing the values from Table1-1 according the adjustment values from Table1-2. At step 990, the PWM module 710 produces the PWM pulse according to the adjusted values. At steps 992,994,996, if more values are left to be read, the loop to read the next row from Table1-1 is repeated. If no more values are left to be read, the previous entire loop is repeated.

FIG. 8 illustrates a PWM sequence that may be generated by a controller as described herein and suitable for a full-bridge or other type of four-input power converter. As shown, only two unique PWM waveforms may be generated. FIG. 9 illustrates an idealized filtered sine wave waveform that is produced after the pulse sequences are applied to the power converter and filtered. As shown, there are zero crossings of the sine wave at times A, B, C, D and E on the horizontal time axis of FIG. 9. These zero crossings align with the transitions between the pulse sequences in FIG. 8.

Considering the waveform between time A and time B, this negative half cycle of the sine wave is generated in response to the pulses 804 of FIG. 8. In some embodiments, the PWM module 710 is configured to produce PWM pulses in which the initial and final pulses are narrower and the central is wider. In some examples, the initial and final pulses are so narrow, that due to the PWM module's electrical structure, the output PWM voltage is not able to reach the full height before the end of the pulse. The modulated width of the sequence of pulses results in the output wave of FIG. 9. By varying the timing and width of the pulses, the amplitude and frequency of the sine wave of FIG. 9 may be varied to suit different loads. A sine wave output is shown here as particularly suitable for the wireless power transfer of FIG. 2, but further varying the timing and width of the pulses can result in completely different waveforms, when appropriate.

In some examples, at least two sequences are needed to drive a single power converter. However, in many cases, only one DMA channel is required to generate the two sequences. For example, a half-bridge power converter typically requires one PWM signal input and a second complementary PWM signal input. The two pulse sequences can be generated by directly generating the first pulse sequence using a PWM module in one channel and then the second PWM sequence can be generated as a complementary signal from the first sequence. In some examples, only one table and one memory channel may be needed. A full bridge power converter as described above in the context of FIGS. 8 and 9 requires two unique sequences and two complementary sequences. The multi-channel controller 704 described herein is beneficial as for example, three-phase converter requires three tables and memory channels plus the three complementary signals that the multi-channel controller 704 described herein can provide in one unit. The configuration of the tables and channels may be configured for other power converters and for more than one power converter.

Figure 12:
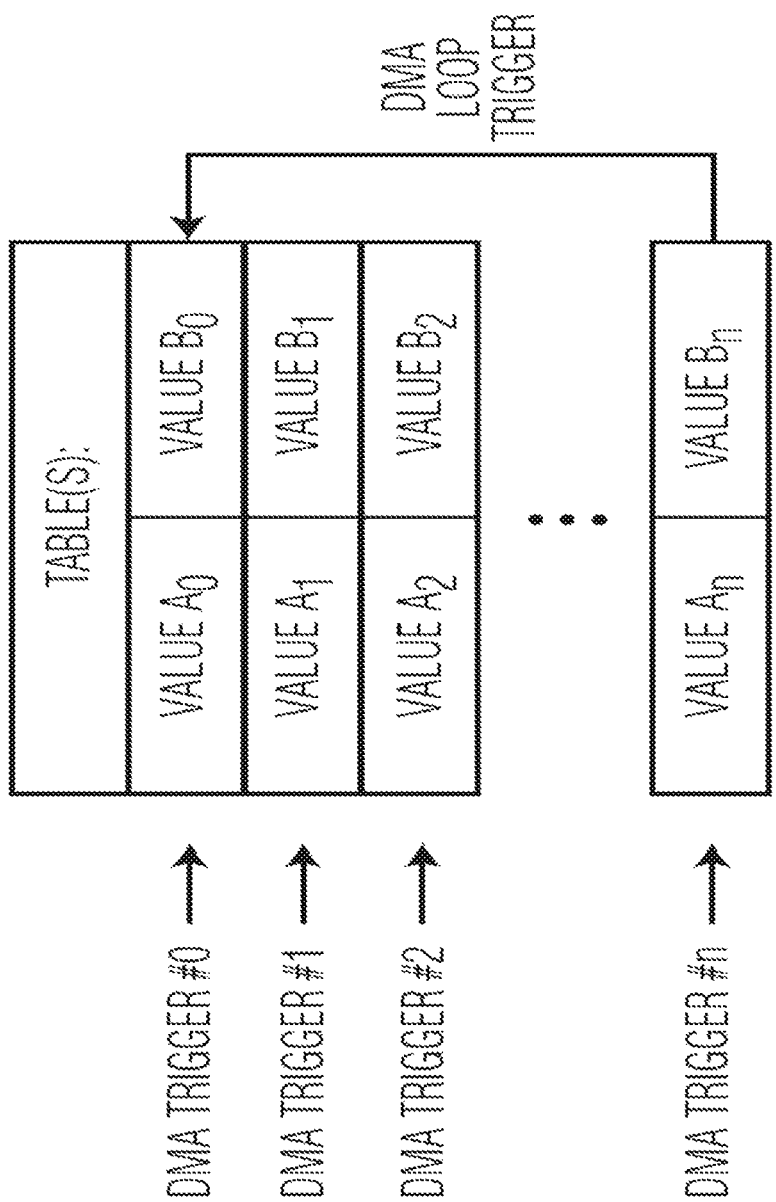
FIG. 12 illustrates a table for PWM values.

FIG. 12 illustrates a table of PWM values in memory such as might be used in the embodiments described above. The table has a column of A values $A_0, A_1, A_2 \ldots A_n$ and a column of B values $B_0, B_1, B_2 \ldots B_n$. The values in each row are aligned and each row is in a sequential order. The PWM values are accessed in the sequential order in response to a trigger from the PWM module to the DWM module to access a row. As an example, in response to the first trigger DMA Trigger #0, the DMA module reads PWM values $A_0$ and $B_0$ from the table and writes the two PWM values into the PWM register for a particular channel. In response to the second trigger, DMA Trigger #1, the DMA module reads the next PWM values in the sequence, $A_1$, and $B_1$, from the table and writes these values into the same PWM register. In response to the third trigger, DMA Trigger #2, the DMA module reads the next PWM values in the sequence, $A_2$, and $B_2$, from the table and writes these values into the same PWM register. This continues through all n rows of the table so that in response to the $n^{th}$ trigger, DMA Trigger #n, the DMA module reads the $n^{th}$ PWM values in the sequence, $A_n$, and $B_n$, from the table and writes these values into the same PWM register. After reading all n values in order and reaching the end of the table, a DMA loop trigger is received at the DMA module and the DMA module goes back from the last row in the sequence, row n, to the first row in the sequence, row 0. The DMA module reads the first row from the table to write into the PWM register. The DMA loop trigger may be an internal DMA signal generated by the DMA module or it may be generated by the PWM.

Figure 13:
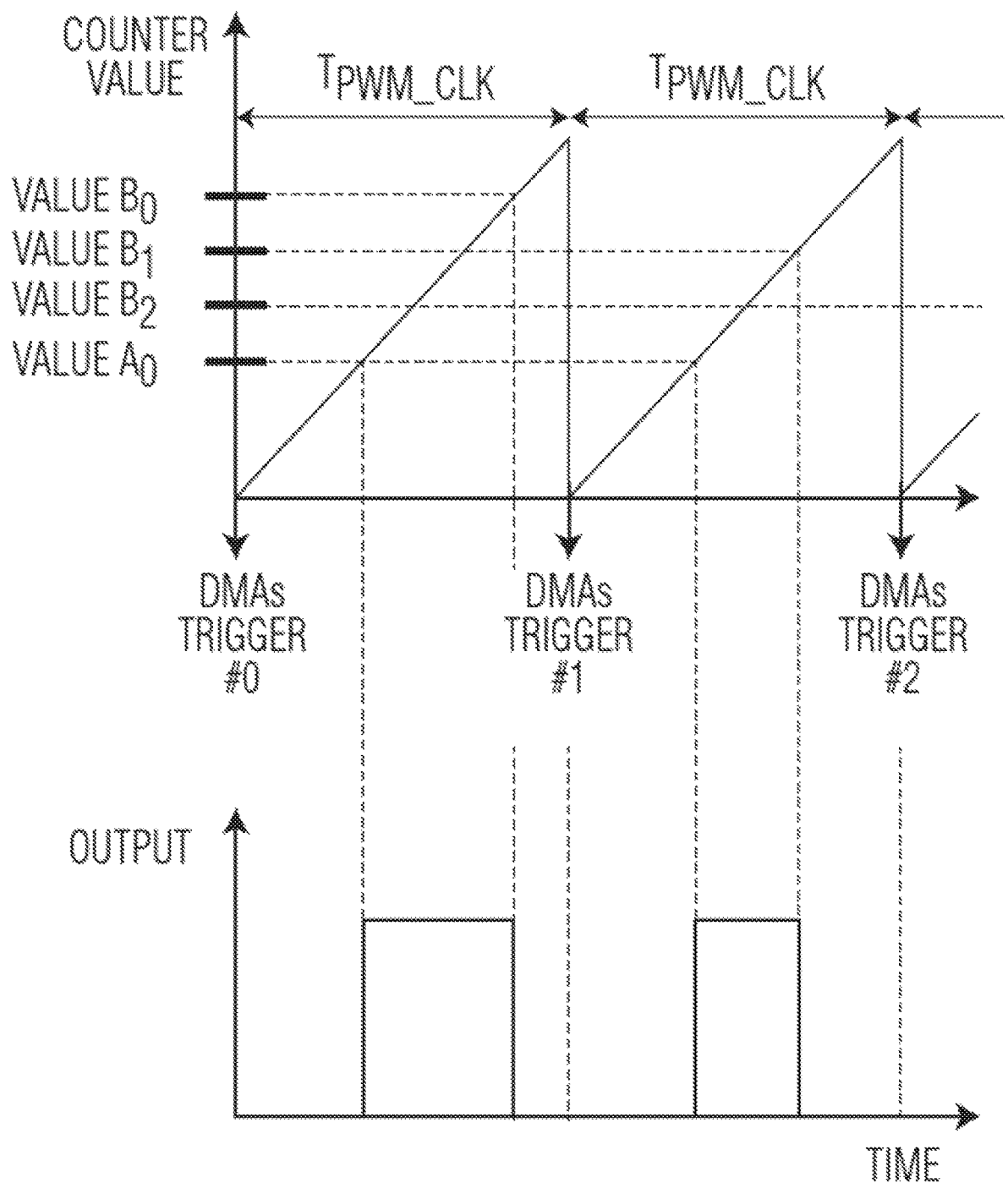
FIG. 13 illustrates a sample wave produced using PWM values.

FIG. 13 illustrates an example of how the values provided by the DMA module may be used to define variable width pulses in the PWM. The top and bottom graphs are aligned on the same time scale with time on the horizontal axis and different triggers aligned on the vertical axis for clarity. Tables (e.g., Table1) may store multiple values. In this example, values A may remain the same while values B may vary depending on a desired output wave, e.g., sine, triangle, saw or others. Values A, B can have 16+6 bits width which brings a high resolution of duty-cycle changes. Duty cycle changes can be used for amplitude regulation with small regulation step A & B values are loaded to PWM modules by DMA after each DMA trigger. After last value of the table is loaded, next value will by A0 and B0 Cyclic repetition is secured by operation of DMA LOOP mode. Table values can be changed between DMA triggers or after last value loading Or at any desired table value.

In the example of FIG. 13, $A_0$ represents a single value that is used as the start time for each pulse. $A_0$ is a time distance on the horizontal scale from the trigger time to the start of the pulse. The B values represent the pulse width. The width of the first pulse is determined by $B_0$ which represents a time duration from the start of the pulse at time $A_0$ or the trigger time to the end of the first pulse. The next value $B_1$ determines the width of the second pulse, which is shown as being narrower because the value $B_1$ is less than $B_0$ so that the time duration of the second pulse is less. The triggers are aligned to a clock rate or cycle time for the pulses that is indicated as $T_{PWM\_CLK}$. This clock rate may be modified by the controller or the PWM module to suit different purposes.

By modifying only the B values, the PWM module may be made to generate different waveforms such as sine waves, triangle waves, sawtooth waves, etc. By modifying both the A and B values a larger range of different pulse widths may be defined at the cost of more complexity. The duty cycle of the pulses may be used to control the amplitude of these waveforms. The accuracy of the PWM values may be determined at least in part by the number of bits for the A and B values. Even with 16-bit values, the system has very fine control over the output power from the power converter.

The controller configuration and topology using DMA and PWM modules allow the controller to generate variable duty cycle PWM signals for many different applications, such as motor controllers, switching power supplies, photovoltaic systems, and even test waveforms. With a single controller, the signal generator is low complexity and allows the controller core to run other applications while also controlling the PWM output signal. Using the high frequency capability of the topology, power converters with high operating frequencies and high power may be driven such as wireless power transmitters.

Figure 14:
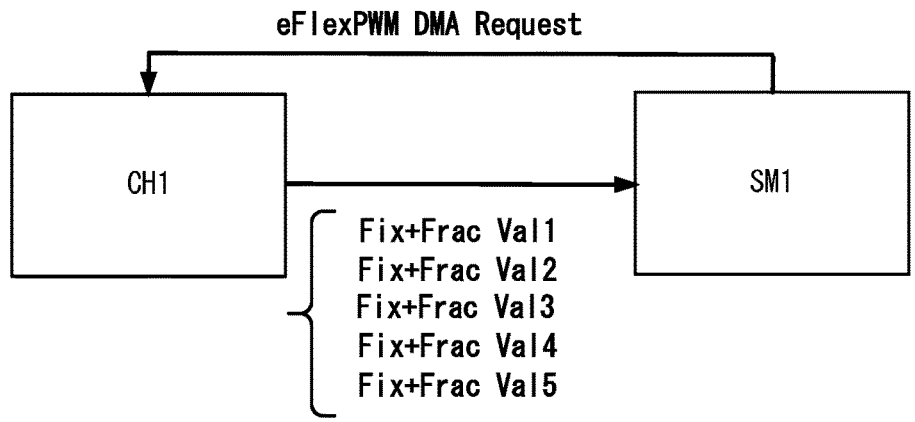
FIG. 14 illustrates a schematic of obtaining multiple values from the memory in one DMA request.

FIG. 14 illustrates the DMA operation to obtain a plurality of values from a table (e.g., Table 1) using just one DMA trigger. As shown, the PWM submodule SM1 may send eFlexPWM DMA request to CH1 and in response SM1 may obtain Val1 to Val5 (Fix as stored in Table1-1+adjustment or frac stored in Table1-2/buffer) instead of making two DMA requests or using two DMA channel.

Figure 15:
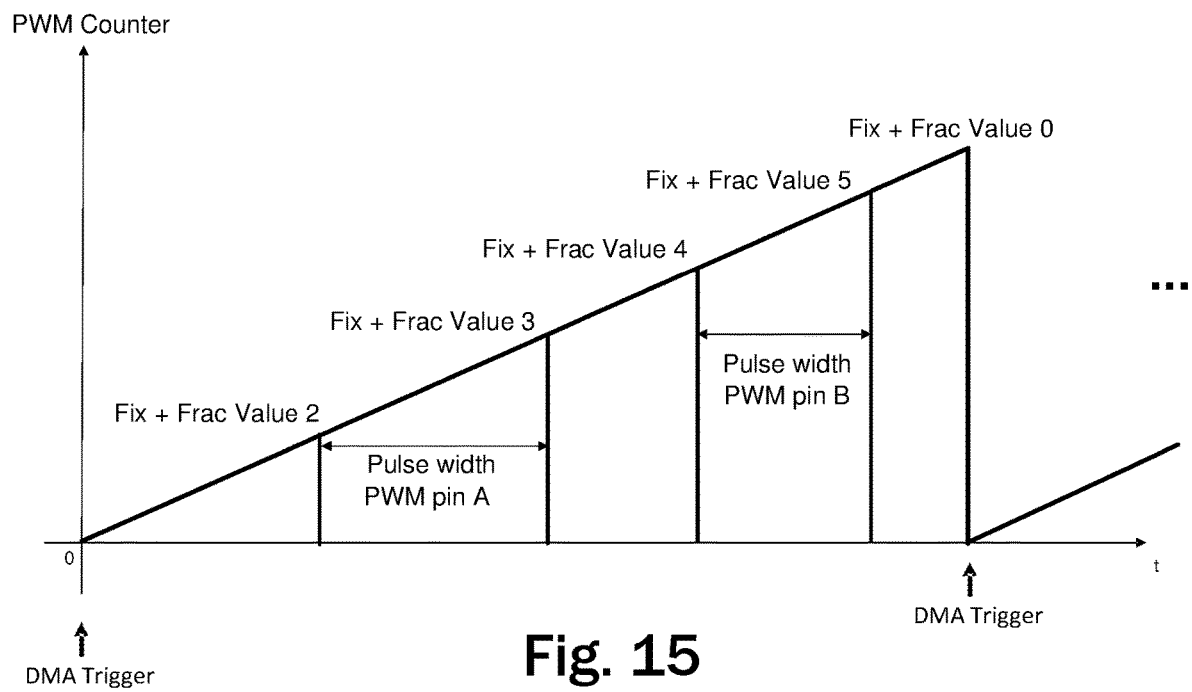
FIG. 15 shows a graph to illustrate pulse width at the two outputs of a PWM module.

FIG. 15 illustrates the translation of PWM values into pulse width of the PWM pulses at the two outputs of $SM_X$ (pin A and pin B). In this example, Val2, Val3 registers drive the output at pin A and Val4, Val5 registers drive the output at pin B. Val0 represents frequency of the pulses. If the frequency of the pulses is required to increase, Val0 value may be decreased and consequently Val1,2,3,4,5 change to ensure that Val1,2,3,4,5<Val0. In some examples, VAL1 may be used for generating internal trigger for other modules (e.g., ADC sampling at desired time relative to generated pulses). X-axis is the time and Y-axis represents incrementation of a PWM counter. The PWM counter value is incremented by 1 every predefined intervals. If counter value matches threshold value (VAL0,1,2,3,4,5) an specified event occurs, e.g., Val2 generates the rising edge on PWM A PIN and Val3 generates the falling edge on PWM A PIN. Similarly, when the counter is 4, Val4 generates the rising edge on PWM B PIN and Val5 generates the falling edge on PWM B PIN. Upon completing one cycle, the PWM counter is reset to 0 and DMA trigger-transferring new Val0,1,2,3, 4,5 values from $Table_X$ to generate next pulse cycle. The DMA module counts number of settings transferred and reloads its source address to first item in $Table_X$ after last is transferred. This process may continue to perform indefinitely until the charging system is turned off.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A controller comprising:
a plurality of pulse width modulation (PWM) modules, each having two outputs, each PWM Module configured to generate a first sequence of pulses and a second sequence of pulses, each pulse in the two sequences of pulses having a width that is modulated by a PWM value stored in a PWM register of the PWM module;
a memory having a plurality of memory tables, each memory table configured to store PWM values to be written into the PWM register;
a plurality of direct memory access (DMA) modules, each coupled to a respective PWM module in the plurality of PWM modules and to a respective memory table in the plurality of memory tables and configured to write a PWM value from the memory table into the PWM register in response to a DMA trigger; and
a core coupled to the plurality of memory tables and configured to write the PWM values into the plurality of memory tables.

2. The controller of claim 1, further including a feedback loop for each of the plurality of memory table and configured to provide adjustment values for the PWM values.

3. The controller of claim 2, wherein the feedback loop includes an analog to digital converter (ADC) to convert an analog signal to a digital data and a buffer to store the digital data.

4. The controller of claim 3, wherein the PWM module is configured to send the DMA trigger to the DMA module after generating each pulse of the sequence of pulses.

5. The controller of claim 4, wherein the memory table has a sequentially ordered plurality of PWM values, and wherein the DMA module is configured to write the PWM values from the memory table into the PWM register in a sequential order in response to each DMA trigger, wherein the PWM values are adjusted using the adjustment values.

6. The controller of claim 5, wherein the DMA module is configured to write the first PWM value in the sequence after writing the last PWM value in the sequence.

7. The controller of claim 1, wherein the PWM module is configured to to drive two inputs of a power converter, wherein the first sequence of pulses translates into a positive side of an analog wave output of the power converter and the second sequence of pulses translates into a negative side of the analog wave output of the power converter.

8. The controller of claim 1, further comprising an input signal interface coupled to the core configured to receive an input signal and wherein the core is configured to modify the PWM values of the table of PWM values in response to the input signal and to write the modified PWM values into the memory.

9. The controller of claim 8, wherein the core is configured to modify the PWM values by selecting a stored set of different PWM values in response to the input signal.

10. The controller of claim 8, wherein the core is configured to modify the PWM values by incrementing and decrementing the PWM values in response to the input signal.

11. The controller of claim 8, wherein the input signal is a closed feedback loop from a power output of a power converter.

12. The controller of claim 8, wherein the input signal is a power output command from an external component.

13. A charging system comprising:
a resonant circuit configured to apply a resonant field to charge a device;
a power converter configured to receive a direct current power and a first sequence of pulses and a second sequence of pulses and produce an alternating power output to drive the resonant circuit, wherein the first sequence of pulses translates into a positive side of the alternating power output and the second sequence of pulses translates into a negative side of the alternating power output;
a pulse width modulation (PWM) module configured to generate the first sequence of pulses and the second sequence of pulses, each having a width that is modulated by a PWM value stored in a register of the PWM module;
a memory having a table of PWM values configured to be written into the PWM module register;
a direct memory access (DMA) module configured to write a PWM value from the table into the PWM register in response to a DMA trigger from the PWM module;
a processing core configured to write the PWM values into the table; and
a feedback loop coupled to an output of the power converter and to the processing core.

14. The system of claim 13, wherein the processing core is configured to modify the PWM values of the memory table in response to an input signal from the feedback loop and to write the modified PWM values into a second memory table that is different from the table.

15. The system of claim 13, wherein the feedback loop includes an analog to digital converter (ADC) to convert an analog signal to a digital data and a buffer to store the digital data.

16. The system of claim 15, wherein the processing core is configured to generate an adjustment value for the PWM values using the digital data and store the adjustment value in a second memory table in the memory.

17. The system of claim 15, further including a second DMA module coupled to the second memory table and the buffer, wherein the second DMA module is configured to access data from both the second memory table and the buffer.

18. The system of claim 16, wherein the processing core is configured to modify PWM values stored in the table according to the adjustment value.

19. The system of claim 15, wherein the PWM module is configured to receive the adjustment value from the second memory table and generate the first sequence of pulses and the second sequence of pulses using the PWM values and the adjustment value.

\* \* \* \* \*